United States Patent
Yu et al.

(10) Patent No.: US 10,341,469 B2
(45) Date of Patent: Jul. 2, 2019

(54) DATA TRANSMISSION METHOD AND APPARATUS AND DATA RECEIVING METHOD AND APPARATUS

(71) Applicant: Beijing Zhigu Tech Co., Ltd., Beijing (CN)

(72) Inventors: Kuifei Yu, Beijing (CN); Ran Xu, Beijing (CN); Guolin Sun, Chengdu (CN); Li Lu, Chengdu (CN); Hangming Zhang, Chengdu (CN)

(73) Assignee: BEIJING ZHIGU TECH CO., LTD., Beijing (CN)

( * ) Notice: Subject to any disclaimer, the term of this patent is extended or adjusted under 35 U.S.C. 154(b) by 60 days.

(21) Appl. No.: 15/234,033

(22) Filed: Aug. 11, 2016

(65) Prior Publication Data

US 2017/0055247 A1 Feb. 23, 2017

(30) Foreign Application Priority Data

Aug. 20, 2015 (CN) .......................... 2015 1 0516050

(51) Int. Cl.
*H04W 72/04* (2009.01)
*H04L 29/06* (2006.01)
(Continued)

(52) U.S. Cl.
CPC ............... *H04L 69/22* (2013.01); *H04L 1/18* (2013.01); *H04L 47/17* (2013.01); *H04L 47/26* (2013.01)

(58) Field of Classification Search
CPC ......... H04L 69/22; H04L 47/17; H04L 47/26; H04L 1/18; H04L 12/911; H04L 29/06; H04W 72/04
(Continued)

(56) References Cited

U.S. PATENT DOCUMENTS 7,089,312 B2 * 8/2006 Liu .................. H04L 1/1621
709/227
7,653,394 B2 * 1/2010 McMillin ............... H04L 45/00
370/331

(Continued)

FOREIGN PATENT DOCUMENTS

CN 101667902 A 3/2010
CN 102256272 A 11/2011
(Continued)

*Primary Examiner* — Man U Phan
(74) *Attorney, Agent, or Firm* — Sheppard Mullin Richter & Hampton LLP

(57) ABSTRACT

Embodiments of this application disclose a data transmission method and apparatus and a data receiving method and apparatus. The data transmission method comprises: responding to a data packet received from a first device, and sending a receiving acknowledgment to the first device; and sending the data packet to a second device, wherein the second device is a target device of the data packet. According to the method and apparatus in the embodiments of this application, a middle device responds to receiving of a data packet and sends a receiving acknowledgment to a device of a sending end, causing that the device of the sending end may send a next data packet without waiting for a receiving acknowledgment that is from a device of a receiving end and that is transmitted by using a relatively long link, which greatly shortens a transmission distance of the receiving acknowledgment, reduces delay of sending of a data packet by the sending end, and improves a data sending rate of the device of the sending end, thereby improving data transmission performance.

20 Claims, 7 Drawing Sheets

(51) Int. Cl.
*H04L 12/801* (2013.01)
*H04L 12/825* (2013.01)
*H04L 1/18* (2006.01)

(58) Field of Classification Search
USPC .................................. 370/236–329, 401–466
See application file for complete search history.

(56) References Cited

U.S. PATENT DOCUMENTS

| | | | | |
|---|---|---|---|---|
| 8,169,911 B2* | 5/2012 | Viger | ...................... | H04L 47/40 370/235 |
| 8,270,379 B2* | 9/2012 | Okamasu | .............. | H04L 1/1657 370/338 |
| 8,289,895 B2* | 10/2012 | Yu | .......................... | H04B 7/155 370/315 |
| 8,451,769 B2* | 5/2013 | Lee | ........................ | H04B 7/155 370/315 |
| 8,737,912 B2* | 5/2014 | Ma | .......................... | H04B 7/155 455/9 |
| 8,743,760 B2* | 6/2014 | Hwang | ................. | H04W 80/02 370/310.2 |
| 8,804,650 B2* | 8/2014 | Horiuchi | ............... | H04L 1/1854 370/329 |
| 8,958,364 B2* | 2/2015 | Ostergaard | ........ | H04W 72/0426 370/310 |
| 9,071,322 B2* | 6/2015 | Ma | .......................... | H04B 7/155 |
| 9,131,001 B2* | 9/2015 | Cherian | ................... | H04L 69/22 |
| 9,544,097 B1* | 1/2017 | Vivanco | .................... | H04L 1/08 |
| 2006/0002301 A1* | 1/2006 | Liu | ........................ | H04L 69/16 370/236 |
| 2007/0275657 A1 | 11/2007 | Chang et al. | | |
| 2008/0108304 A1 | 5/2008 | Suga | | |
| 2010/0135209 A1* | 6/2010 | Harada | ............... | H04W 76/048 370/328 |
| 2012/0120867 A1* | 5/2012 | Horiuchi | ................ | H04B 7/155 370/315 |
| 2012/0257509 A1 | 10/2012 | Natarajan et al. | | |
| 2014/0119271 A1 | 5/2014 | Wong et al. | | |
| 2014/0160930 A1* | 6/2014 | Kwon | ................... | H04W 16/26 370/235 |
| 2016/0241482 A1* | 8/2016 | Tsuruoka | .............. | H04L 47/621 |
| 2017/0149547 A1* | 5/2017 | Kim | ...................... | H04L 5/0055 |
| 2017/0244521 A1* | 8/2017 | Lim | ...................... | H04L 1/1819 |

FOREIGN PATENT DOCUMENTS

| | | |
|---|---|---|
| CN | 103795453 A | 5/2014 |
| CN | 104702331 A | 6/2015 |

* cited by examiner

| 32 bytes |||||
|---|---|---|---|---|
| 8 | 8 | 8 | 8 ||
| Version | Packet header length | Service type/not classified | Total length ||
| Identifier || Mark | Header offset ||
| Survival time | Protocol | Header check sum ||
| Source address ||||
| Destination address ||||
| Optional ||| Fill |

FIG. 6(c)

| 32 bytes |||||
|---|---|---|---|---|
| 8 | 8 | 8 | 8 ||
| Version | 1010 | Service type/not classified | Total length ||
| Identifier || Mark | Header offset ||
| Survival time | Protocol | Header check sum ||
| Source address ||||
| Destination address ||||
| HASH value ||||

FIG. 6(d)

DATA TRANSMISSION METHOD AND APPARATUS AND DATA RECEIVING METHOD AND APPARATUS

TECHNICAL FIELD

This application relates to the field of communications technologies, and in particular, to a data transmission method and apparatus and a data receiving method and apparatus.

BACKGROUND

As shown in FIG. 1, in conventional wireless network data transmission, a reliable communication process between user equipment UE 102 (which may also be referred to as station (STA)) of a sending end and user equipment UE 110 of a receiving end is as follows: The UE 102 of the sending end sends a data packet to the UE 110 of the receiving end and temporarily stores the data packet; the data packet passes at least one middle device (which comprises, but is not limited to an AP 104, a router 106, an AP 108, and the like) and is received by the UE 110 of the receiving end; and after receiving the data packet, the UE 110 of the receiving end returns a receiving acknowledgment (ACK), the receiving acknowledgment is returned to the UE 102 of the sending end after being forwarded by the middle device, and after receiving the receiving acknowledgment, the UE 102 of the sending end continues to send a next data packet. In such a process, a device of a sending end continues to send data only after receiving a receiving acknowledgment of a target device, which obviously lowers a data sending rate of the device of the sending end. In addition, for some embedded devices, because hardware resources of the embedded devices are limited, if generated data cannot be sent for a long time, data loss may occur. With development of wireless communications technologies, more services have a relatively high requirement on delay, and such a transmission mechanism severely affects transmission performance.

SUMMARY

In view of this, an objective of embodiments of this application is to provide a new data transmission solution.

To achieve the foregoing objective, according to a first aspect of the embodiments of this application, a data transmission method is provided, comprising:

responding to a data packet received from a first device, and sending a receiving acknowledgment to the first device; and sending the data packet to a second device, wherein the second device is a target device of the data packet.

According to a second aspect of the embodiments of this application, a data receiving method is provided, comprising:

responding to a data packet received from a first device, and sending a receiving acknowledgment to the first device; and sending the data packet to a second device, wherein the second device is a target device of the data packet.

According to a third aspect of this application, a data transmission apparatus is provided, wherein the apparatus comprises:

a first acknowledgment module, configured to respond to a data packet received from a first device, and send a receiving acknowledgment to the first device; and a first sending module, configured to send the data packet to a second device, wherein the second device is a target device of the data packet.

According to a fourth aspect of this application, a data receiving apparatus is provided, wherein the apparatus comprises:

a receiving module, configured to receive a data packet; and a second sending module, configured to send a receiving acknowledgment associated with the data packet and first identification information associated with the data packet, wherein the first identification information is used to instruct not to forward the receiving acknowledgment.

According to a fifth aspect of this application, a data transmission apparatus is provided, wherein the apparatus comprises:

a transceiver, configured to receive a data packet and send a receiving acknowledgment;

a memory, configured to store an instruction; and a processor, configured to execute the instruction stored in the memory, wherein the instruction enables the processor to perform the following steps:

responding to a data packet received by the transceiver from a first device, and sending a receiving acknowledgment to the first device by using the transceiver; and sending the data packet to a second device by using the transceiver, wherein the second device is a target device of the data packet.

According to a sixth aspect of this application, a data receiving apparatus is provided, wherein the apparatus comprises:

a transceiver, configured to receive a data packet and send a receiving acknowledgment associated with the data packet and first identification information associated with the data packet;

a memory, configured to store an instruction; and a processor, configured to execute the instruction stored in the memory, wherein the instruction enables the processor to perform the following steps:

receiving a data packet by using the transceiver and sending a receiving acknowledgment associated with the data packet and first identification information associated with the data packet.

According to the method and the apparatus in the embodiments of this application, a middle device responds to receiving of a data packet and sends a receiving acknowledgment to a device of a sending end, causing that the device of the sending end may send a next data packet without waiting for a receiving acknowledgment that is from a device of a receiving end and that is transmitted by using a relatively long link, which greatly shortens a transmission distance of the receiving acknowledgment, reduces delay of sending of a data packet by the sending end, and improves a data sending rate of the device of the sending end, thereby improving data transmission performance.

BRIEF DESCRIPTION OF THE DRAWINGS

FIG. 6 (b) is a schematic flowchart of data transmission in the scenario shown in FIG. 6(a);

FIG. 6 (c) is a schematic structural diagram of an IP data packet header;

FIG. 6 (d) is a schematic structural diagram of an IP data packet header modified according to each embodiment of this application;

DETAILED DESCRIPTION

Specific implementing manners of the present invention are further described in detail below with reference to the accompanying drawings and embodiments. The following embodiments are intended to describe the present invention, but not to limit the scope of the present invention.

It should be understood by a person skilled in the art that the terms such as "first" and "second" in this application are merely intended to distinguish different devices, modules, or parameters, etc., which neither represent any particular technical meaning nor indicate a necessary logical sequence between them.

Figure 2:
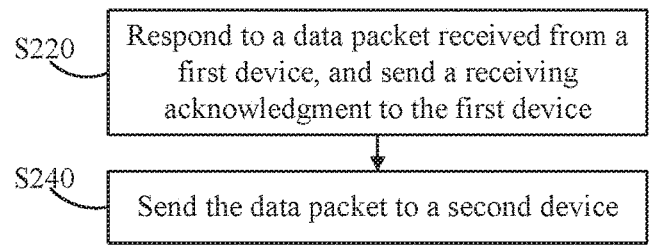
FIG. 2 is a flowchart of an example of a data transmission method according to an embodiment of this application.

FIG. 2 is a flowchart of an example of a data transmission method according to an embodiment of this application. The method may be performed by any middle device in a data transmission process. The middle device comprises, but is not limited to any device that can send a data packet from a device of a sending end (which may also be referred to as a first device) to a device of a receiving end (which may also be referred to as a second device) such as an access point (Access Point, AP) device and a route device. In addition, in each embodiment of this application, both the first device and the second device are devices having wireless receiving and sending functions, which comprise but are not limited to: a telephone (for example, a cellular phone or a smart phone), a computer (for example, a notebook computer), a portable communications device, a portable computing device (for example, a personal data assistant), an entertainment device (for example, a music or video device or a satellite radio device), a global positioning system GPS device, or another suitable device that is configured to perform communication by using a wireless medium. It should be noted that, the middle device, the first device, and the second device may be same devices.

As shown in FIG. 2, a data transmission method in an embodiment of this application comprises:

S220: Respond to a data packet received from a first device, and send a receiving acknowledgment to the first device.

S240: Send the data packet to a second device, wherein the second device is a target device of the data packet.

Data transmission performed according to the method in this embodiment may mean a process in which a data packet is transmitted from a source device to a destination device, that is, the first device and the second device are respectively a source device and a destination device of the data packet; and may also occur in any transmission stage of a data packet from a source device to a destination device. In addition, in a process in which data transmission is performed according to the method in this embodiment, a data packet from the first device is still forwarded to the second device by using a middle device. The second device is a target device of the data packet, and the "target device" may be a final destination device of the data packet, or may be a next-hop or multi-hop device of the data packet. However, different from conventional feedback of a receiving acknowledgment through a link from the target device to at least one middle device and then to the first device, in the method of this embodiment, the middle device performing the method in this embodiment responds to the data packet received from the first device, and directly feeds back a receiving acknowledgment to the first device. For example, after correctly receiving the data packet from the first device, the middle device instantly feeds back a receiving acknowledgment to the first device and sends the data packet to the second device. A transmission link of the receiving acknowledgment is from the middle device to the first device.

In conclusion, according to the method in this embodiment, a middle device responds to receiving of a data packet and sends a receiving acknowledgment to a device of a sending end, causing that the device of the sending end may send a next data packet without waiting for a receiving acknowledgment that is from a device of a receiving end and that is transmitted by using a relatively long link, which greatly shortens a transmission distance of the receiving acknowledgment, reduces delay of sending of a data packet by the sending end, and improves a data sending rate of the device of the sending end, thereby improving data transmission performance.

Figure 1:
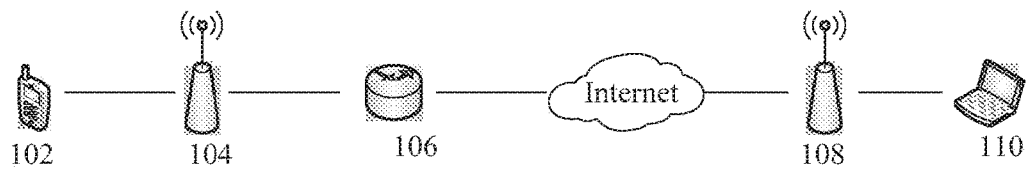
FIG. 1 is a data transmission scenario of an example.

It should be noted that, according to different manners in which the middle device and the first device are connected (wired or wireless), in the method in this embodiment, the receiving acknowledgment may be a Media Access Control MAC layer message, or may be a Transmission Control Protocol TCP layer message. For example, in a scenario shown in FIG. 1, the first device is UE 102 of a sending end. If the middle device is an AP 104, feedback from the AP 104 to the UE 102 of the sending end is a MAC layer message. If the middle device is AP 108, feedback from the AP 108 to the UE 102 of the sending end is a TCP layer message. In addition, according to different middle devices, lengths of transmission links of a receiving acknowledgment are varied. The method applied to this embodiment can also be different in improving a data sending rate of a device of a sending end.

In addition, the data packet may be lost or out of time when is on a part, which is from the at least one middle device to the second device, of a link, and therefore, the data packet needs to be retransmitted. In a possible implementing manner, after the data packet is sent to the second device, if a not-receiving acknowledgment (NACK) is received from the second device, the not-receiving acknowledgment may be fed back to the first device, and the first device retransmits a corresponding data packet. Alternatively, after the data packet is sent to the second device, if a receiving acknowledgment from the second device is not received within a first preset time, the first device is notified in any possible manner to retransmit a corresponding data packet.

In another possible implementing manner, the middle device performing the method in this embodiment may retransmit a data packet if needed. Specifically, after the data packet is sent to the second device, if a not-receiving acknowledgment (NACK) from the second device is received, a corresponding data packet may be directly retransmitted, without feedback to the first device. Alternatively, after the data packet is sent to the second device, if a receiving acknowledgment from the second device is not received within a first preset time, a corresponding data packet may be directly retransmitted, without feedback to the first device. To implement such an implementing manner, the method in this embodiment further comprises:

S260: Temporarily store the data packet.

Besides returning the receiving acknowledgment to the first device and sending, to the second device, the data packet from the first device, the middle device performing the method in this embodiment may further temporarily store the data packet from the first device, for example, store the data packet locally, and therefore, the data packet can be retransmitted when needed, thereby saving time spent in feeding back the not-receiving acknowledgment to the first device and time needed for implementing retransmission by the first device through a relatively long link, and further improving data transmission performance. In addition, for the first device, after receiving the receiving acknowledgment from the middle device, the first device may release storage space for temporarily storing a corresponding data packet, without waiting for a receiving acknowledgment from the second device, thereby lowering a requirement on storage space of the first device and reducing pressure of storage space of the first device to an extent.

To enable the middle device to implement retransmission when needed, according to the method in this embodiment, a particular marking mechanism may be used when the data packet is temporarily stored. In a possible implementing manner, the method in this embodiment further comprises:

S232: Generate second identification information associated with the data packet.

S234: Send the second identification information to the second device.

The second identification information is used to mark the data packet, to cause that the second device can make a corresponding mark when feeding back a not-receiving acknowledgment, and the middle device can identify, according to information related to the second identification information, a data packet needing to be retransmitted.

In a possible implementing manner, to prevent the middle device from performing complex processing, the second identification information may be sent to the second device by adding the second identification information to the data packet. For example, the second identification information is placed into a header of the data packet. A retransmission manner based on an IP layer is used as an example. A structure of a standard IP data packet header may be shown in FIG. 6 (c). A header length (Header Length) of the IP data packet is four bytes, which represents the header length of the IP data packet. A field Option represents an optional field. The second identification information may be placed in an optional field (Option) of the IP header. In addition, to ensure a header structure of the data packet and uniqueness of the second identification information, in a possible implementing manner, a HASH function, which is known to both the middle device and the second device (for example, the function is determined through a negotiation between the middle device and the second device) may be used to generate the second identification information.

Specifically, the second identification information may comprise a HASH value that is associated with a serial number of the data packet and a second type. The serial number may be generated by the middle device and is a unique ID of the data packet, and the second type may be that a data packet is sent and used to indicate a behavior of sending the data packet, so as to be identified by the second device.

Correspondingly, the method in this embodiment further comprises:

S282: Respond to a receiving acknowledgment that is received from the second device and that is associated with the data packet, and release, based on the second identification information, storage space for temporarily storing the data packet.

S284: Respond to a not-receiving acknowledgment that is received from the second device and that is associated with the data packet, and retransmit the data packet to the second device based on the second identification information.

S286: Respond to a receiving acknowledgment that is not received from the second device within a first preset time and that is associated with the data packet, and retransmit the data packet to the second device based on the second identification information.

The foregoing processes of sending, retransmitting, and feedback from the middle device to the device of the receiving end all are transparent to the device of the sending end, thereby greatly improving a data transmission rate of the device of the sending end and reducing needs of reallocation of resources on a sending end side or data retransmission needs caused when a packet is lost or out of time. In addition, storage pressure of the device of the sending end is also relieved.

It should be noted that, although in the method in this embodiment, a need of retransmission from the device of the sending end to the device of the receiving end is cancelled, there is the possibility that retransmission occurs between the device of the sending end and the middle device. In this case, the method in this embodiment further comprises:

S290: Respond to that the data packet from the first device is not correctly received, and send a not-receiving acknowledgment to the first device.

Similar to the receiving acknowledgment fed back by the middle device to the first device, the not-receiving acknowledgment is a MAC layer message or a TCP layer message.

In conclusion, the method in this embodiment has relatively high data transmission performance.

Figure 3:
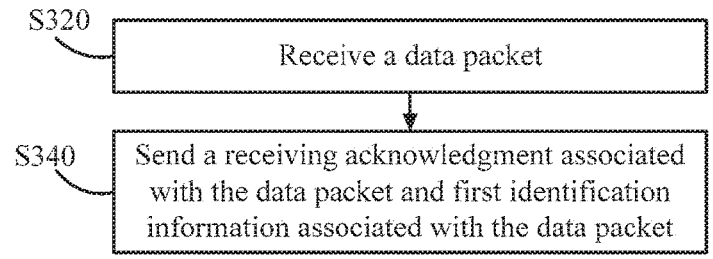
FIG. 3 is a flowchart of an example of a data receiving method according to an embodiment of this application.

FIG. 3 is a flowchart of an example of a data receiving method according to an embodiment of this application. The method may be performed by any receiving end. As shown in FIG. 3, the method comprises:

S320: Receive a data packet.

S340: Send a receiving acknowledgment associated with the data packet and first identification information associated with the data packet, wherein the first identification information is used to instruct not to forward the receiving acknowledgment.

In the method in this embodiment, after correctly receiving a data packet from any middle device, a device of a receiving end (second device) may directly feed back a receiving acknowledgment associated with the data packet. In addition, corresponding to and with reference to the method shown in FIG. 2, because the middle device has already fed back the receiving acknowledgment associated with the data packet to a device of a sending end (first device), to enable the middle device to identify such a type of data packet and prevent the middle device from feeding back the receiving acknowledgment to the first device twice, in step S340, first identification information associated with the data packet is further fed back to the middle device. Similar the foregoing second identification information, in a possible implementing manner, a HASH function may be used to generate the first identification information. The first identification information may also comprise a HASH value that is associated with a serial number of the data packet and a first type. The serial number is a unique ID of the data packet and may be generated by the middle device or may be generated by the second device performing the method in this embodiment; and the first type may be a data packet receiving acknowledgment and used to indicate a behavior of feeding back a receiving acknowledgment.

It should be noted that, according to different manners in which the middle device and the second device are connected, in the method in this embodiment, the receiving acknowledgment may be a TCP layer message, or may be a MAC layer message. For example, in a scenario shown in FIG. 1, the second device is UE 110 of a receiving end. If the middle device is an AP 104, an ACK fed back by the UE 110 of the receiving end to the AP 104 is a TCP layer message. If the middle device is an AP 108, an ACK fed back by the UE 110 of the receiving end to the AP 108 is a MAC layer message.

In conclusion, according to the method in this embodiment, in a manner of directly feeding back a receiving acknowledgment by a middle device, a transmission distance of a conventional receiving acknowledgment is shortened, delay of sending a data packet by a sending end is reduced, and a data sending rate of a device of a sending end is improved, thereby improving data transmission performance.

In addition, the method in this embodiment further comprises:

S360: Respond to that the data packet is not correctly received, and send a not-receiving acknowledgment associated with the data packet and the first identification information associated with the data packet, to cause that the middle device can respond to receiving of the not-receiving acknowledgment, and identify, according to information related to the first identification information, a data packet needing to be retransmitted.

Similar to the receiving acknowledgment fed back to the middle device, the not-receiving acknowledgment may also be a TCP layer message, or may also be a MAC layer message.

With reference to an implementing manner of the middle device also sends second identification information associated with the data packet when sending the data packet, which is described in FIG. 2, the method in this embodiment may further comprise:

S332: Receive second identification information associated with the data packet.

S334: Generate the first identification information based on the second identification information.

For example, the second identification information may be directly received, or the second identification information is acquired in a manner of parsing a header of the received data packet; and a HASH value is generated by using same serial number and first type and used as the first identification information.

In a possible implementing manner, in step S340, the first identification information may be sent by adding the first identification information to the receiving acknowledgment.

In conclusion, the method in this embodiment can help to improve transmission performance with reference to the method shown in FIG. 2.

It may be understood by a person skilled in the art that, in the foregoing methods of the specific implementing manners of this application, sequence numbers of the steps do not mean execution sequences. The execution sequences of the steps should be determined according to functions and internal logic of the steps, and should not be construed as any limitation on the implementation processes of the specific implementing manners of this application.

In addition, the embodiments of this application further provide a computer readable medium, comprising computer readable instructions for being executed to perform the following operations: operations of steps in the method in the implementing manner as shown in FIG. 2 are performed.

In addition, the embodiments of this application further provide a computer readable medium, comprising computer readable instructions for being executed to perform the following operations: operations of steps in the method in the implementing manner as shown in FIG. 3 are performed.

FIG. 4 (a) is a structural block diagram of an example of a data transmission apparatus according to an embodiment of this application. The apparatus may be or may belong to any middle device in a data transmission process. Such a middle device comprises, but is not limited to any device that can send a data packet from a device of a sending end (which may also be referred to as a first device) to a device of a receiving end (which may also be referred to as a second device) such as an access point (Access Point, AP) device and a route device.

Figure 4A:
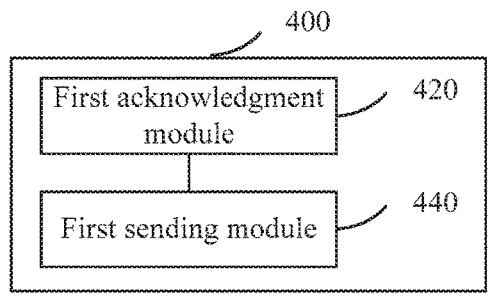
FIG. 4 (a) to FIG. 4 (d) is a structural block diagram of multiple examples of a data transmission apparatus according to an embodiment of this application.

As shown in FIG. 4(a), a data transmission apparatus 400 in this embodiment of this application comprises:

a first acknowledgment module 420, configured to respond to a data packet received from a first device, and send a receiving acknowledgment to the first device; and a first sending module 440, configured to send the data packet to a second device, wherein the second device is a target device of the data packet.

Data transmission performed by the apparatus in this embodiment may mean a process in which a data packet is transmitted from a source device to a destination device; and may also occur in any transmission stage of a data packet from a source device to a destination device. In addition, in a process in which data transmission is performed by the apparatus in this embodiment, a data packet from the first device is still forwarded to the second device by using a middle device. The second device is a target device of the data packet, and the "target device" may be a final destination device of the data packet, or may be a next-hop or multi-hop device of the data packet. However, different from conventional feedback of a receiving acknowledgment through a link from the target device to at least one middle device and then to the first device, in the apparatus of this embodiment, the middle device responds to the data packet received from the first device, and directly feeds back a receiving acknowledgment to the first device. For example, after correctly receiving the data packet from the first device, the middle device instantly feeds back a receiving acknowledgment to the first device and sends the data packet to the second device. A transmission link of the receiving acknowledgment is from the middle device to the first device.

In conclusion, the apparatus in this embodiment responds to receiving of a data packet and sends a receiving acknowledgment to a device of a sending end, causing that the device of the sending end may send a next data packet without waiting for a receiving acknowledgment that is from a device of a receiving end and that is transmitted by using a relatively long link, which greatly shortens a transmission distance of the receiving acknowledgment, reduces delay of sending of a data packet by the sending end, and improves a data sending rate of the device of the sending end, thereby improving data transmission performance.

It should be noted that, according to different manners in which the apparatus in this embodiment and the first device are connected (wired or wireless), in the apparatus in this embodiment, the receiving acknowledgment may be a Media Access Control MAC layer message, or may be a Transmission Control Protocol TCP layer message.

In addition, the data packet may be lost or out of time when is on a part, which is from the at least one middle device to the second device, of a link, and therefore, the data packet needs to be retransmitted. In a possible implementing manner, after the apparatus in this embodiment sends the data packet to the second device, if a not-receiving acknowledgment (NACK) is received from the second device, the not-receiving acknowledgment may be fed back to the first device, and the first device retransmits a corresponding data packet. Alternatively, after the apparatus in this embodiment sends the data packet to the second device, if a receiving acknowledgment from the second device is not received within a first preset time, the first device is notified in any possible manner to retransmit a corresponding data packet.

Figure 4B:
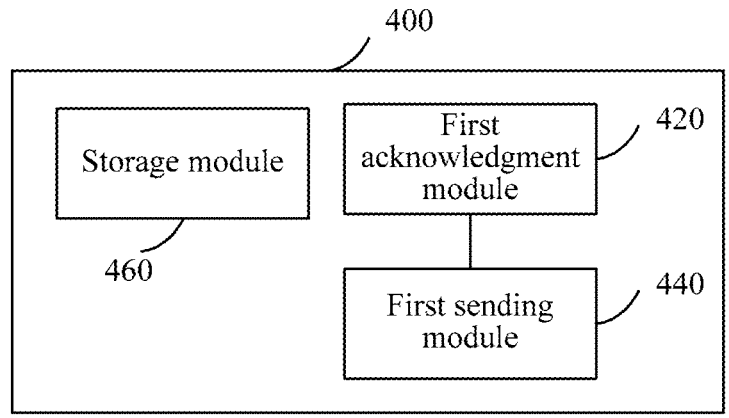

In another possible implementing manner, the apparatus in this embodiment may retransmit a data packet if needed. Specifically, after the apparatus in this embodiment sends the data packet to the second device, if a not-receiving acknowledgment (NACK) from the second device is received, a corresponding data packet may be directly retransmitted, without feedback to the first device. Alternatively, after the apparatus in this embodiment sends the data packet to the second device, if a receiving acknowledgment from the second device is not received within a first preset time, a corresponding data packet may be directly retransmitted, without feedback to the first device. To implement such an implementing manner, as shown in FIG. 4(b), the apparatus 400 in this embodiment further comprises:

a storage module 460, configured to temporarily store the data packet.

Besides returning the receiving acknowledgment to the first device and sending, to the second device, the data packet from the first device, the apparatus in this embodiment may further temporarily store the data packet from the first device, for example, store the data packet locally, and therefore, the data packet can be retransmitted when needed, thereby saving time spent in feeding back the not-receiving acknowledgment to the first device and time needed for implementing retransmission by the first device through a relatively long link, and further improving data transmission performance. In addition, for the first device, after receiving the receiving acknowledgment from the middle device, the first device may release storage space for temporarily storing a corresponding data packet, without waiting for a receiving acknowledgment from the second device, thereby lowering a requirement on storage space of the first device and reducing pressure of storage space of the first device to an extent.

Figure 4C:
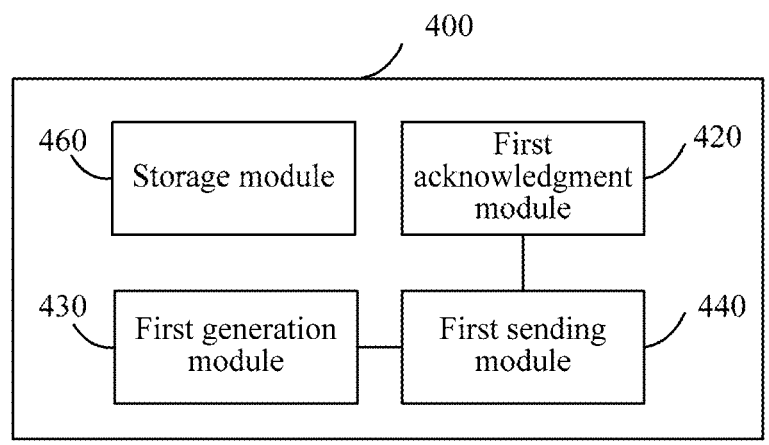
Figure 4D:
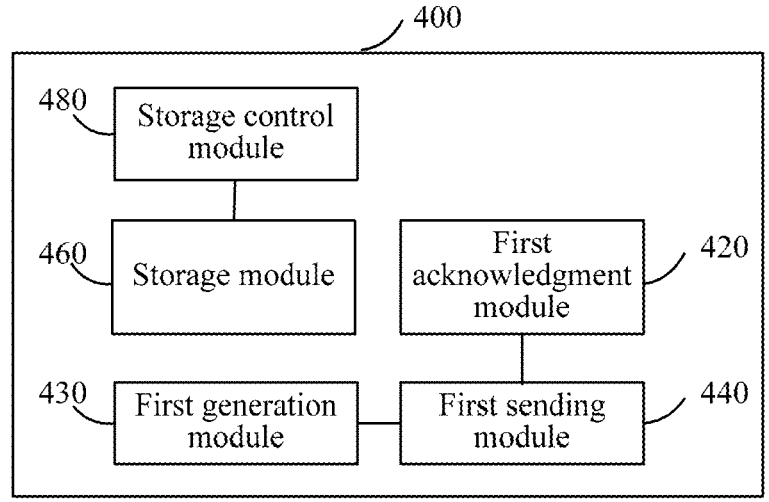

To enable the middle device to implement retransmission when needed, a particular marking mechanism may be used when the apparatus in this embodiment temporarily stores the data packet. In a possible implementing manner, as shown in FIG. 4(c), the apparatus 400 in this embodiment further comprises:

a first generation module 430, configured to generate second identification information associated with the data packet, wherein the first sending module 440 is further configured to send the second identification information to the second device.

The second identification information is used to mark the data packet, to cause that the second device can make a corresponding mark when feeding back a not-receiving acknowledgment, and the middle device can identify, according to information related to the second identification information, a data packet needing to be retransmitted.

In a possible implementing manner, to prevent the middle device from performing complex processing, the first sending module 440 may send the second identification information to the second device by adding the second identification information to the data packet. For example, the second identification information is placed into a header of the data packet. A retransmission manner based on an IP layer is used as an example. A structure of a standard IP data packet header may be shown in FIG. 6 (c), and the second identification information may be placed into an optional field (Option) of the IP header. In addition, to ensure a header structure of the data packet and uniqueness of the second identification information, in a possible implementing manner, a HASH function, which is known to both the middle device and the second device (for example, the function is determined through a negotiation between the middle device and the second device) may be used to generate the second identification information. Specifically, the second identification information may comprise a HASH value that is associated with a serial number of the data packet and a second type. The serial number may be generated by the middle device and is a unique ID of the data packet, and the second type may be that a data packet is sent and used to indicate a behavior of sending the data packet, so as to be identified by the second device.

Correspondingly, as shown in FIG. 4 (d), the apparatus 400 in this embodiment further comprises:

a storage control module 480, configured to respond to a receiving acknowledgment that is received from the second device and that is associated with the data packet, and release, based on the first identification information, storage space for temporarily storing the data packet.

The first sending module 440 is further configured to respond to a not-receiving acknowledgment that is received from the second device and that is associated with the data packet, and retransmit the data packet to the second device based on the first identification information; and respond to a receiving acknowledgment that is not received from the second device within a first preset time and that is associated with the data packet, and retransmit the data packet to the second device based on the first identification information.

According to the apparatus in this embodiment, the foregoing processes of sending, retransmitting, and feedback from the middle device to the device of the receiving end all are transparent to the device of the sending end, thereby greatly improving a data transmission rate of the device of the sending end and reducing needs of reallocation of resources on a sending end side or data retransmission needs caused when a packet is lost or out of time. In addition, storage pressure of the device of the sending end is also relieved.

It should be noted that, although the apparatus in this embodiment cancels a need of retransmission from the device of the sending end to the device of the receiving end, there is the possibility that retransmission occurs between the device of the sending end and the middle device. In this case, the first acknowledgment module 420 is further configured to respond to that the data packet from the first device is not correctly received, and send a not-receiving acknowledgment to the first device.

Similar to the receiving acknowledgment fed back by the middle device to the first device, the not-receiving acknowledgment is a MAC layer message or a TCP layer message.

It should be noted that, the receiving acknowledgment, the not-receiving acknowledgment, and receiving from the first device may be implemented by a receiving unit that is independent from the apparatus in this embodiment, but belongs to the middle device. Alternatively, the apparatus in this embodiment may further comprise a receiving unit implementing this.

In conclusion, the apparatus in this embodiment has relatively high data transmission performance.

Figure 5A:
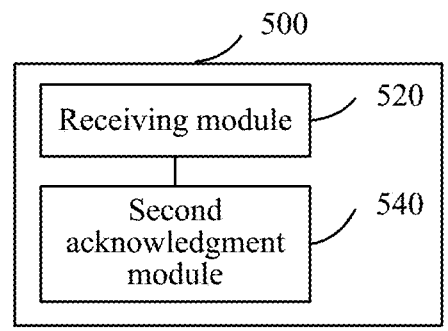
FIG. 5 (a) to FIG. 5 (b) is a structural block diagram of multiple examples of a data receiving apparatus according to an embodiment of this application.

FIG. 5 (a) is a structural block diagram of an example of a data receiving apparatus according to an embodiment of this application. The apparatus may be or may belong to any device of a receiving end. As shown in FIG. 5 (a), the apparatus 500 comprises:

a receiving module 520, configured to receive a data packet; and a second acknowledgment module 540, configured to send a receiving acknowledgment associated with the data packet and first identification information associated with the data packet, wherein the first identification information is used to instruct not to forward the receiving acknowledgment.

In the apparatus in this embodiment, after correctly receiving a data packet from any middle device, a device of a receiving end (second device) may directly feed back a receiving acknowledgment associated with the data packet. In addition, corresponding to and with reference to the apparatus shown in FIG. 4(a) to FIG. 4(b), because the middle device has already fed back the receiving acknowledgment associated with the data packet to a device of a sending end (first device), to enable the middle device to identify such a type of data packet and prevent the middle device from feeding back the receiving acknowledgment to the first device twice, the second acknowledgment module 540 further feeds back first identification information associated with the data packet to the middle device. Similar the foregoing second identification information, in a possible implementing manner, a HASH function may be used to generate the first identification information. The first identification information may also comprise a HASH value that is associated with a serial number of the data packet and a first type. The serial number is a unique ID of the data packet and may be generated by the middle device or may be generated by the apparatus in this embodiment; and the first type may be a data packet receiving acknowledgment and used to indicate a behavior of feeding back a receiving acknowledgment.

It should be noted that, according to different manners in which the middle device and the apparatus in this embodiment are connected, in the apparatus in this embodiment, the receiving acknowledgment may be a TCP layer message, or may be a MAC layer message. For example, in a scenario shown in FIG. 1, the second device is UE 110 of a receiving end. If the middle device is an AP 104, an ACK fed back by the UE 110 of the receiving end to the AP 104 is a TCP layer message. If the middle device is an AP 108, an ACK fed back by the UE 110 of the receiving end to the AP 108 is a MAC layer message.

In conclusion, according to the apparatus in this embodiment, in a manner of directly feeding back a receiving acknowledgment by a middle device, a transmission distance of a conventional receiving acknowledgment is shortened, delay of sending a data packet by a sending end is reduced, and a data sending rate of a device of a sending end is improved, thereby improving data transmission performance.

In addition, the second acknowledgment module 540 is further configured to respond to that the data packet is not correctly received, and send a not-receiving acknowledgment associated with the data packet and the first identification information associated with the data packet, to cause that the middle device can respond to receiving of the not-receiving acknowledgment, and identify, according to information related to the first identification information, a data packet needing to be retransmitted.

Similar to the receiving acknowledgment fed back to the middle device, the not-receiving acknowledgment may also be a TCP layer message, or may also be a MAC layer message.

Figure 5B:
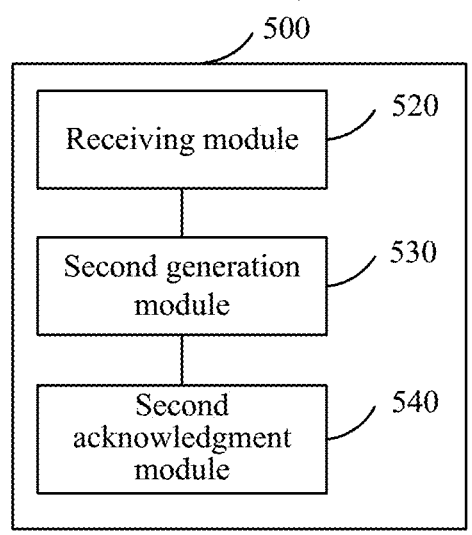

With reference to an implementing manner of the middle device also sends second identification information associated with the data packet when sending the data packet, which is described in FIG. 4(a) to FIG. 4(d), the receiving module 520 is further configured to receive second identification information associated with the data packet. As shown in FIG. 5(b), the apparatus 500 in this embodiment may further comprise:

a second generation module 530, configured to generate the first identification information based on the second identification information.

For example, the receiving module 520 may directly receive the second identification information, or acquire the second identification information in a manner of parsing a header of the received data packet; and the second generation module 530 generates a HASH value by using same serial number and first type and uses the HASH value as the first identification information.

In a possible implementing manner, the second acknowledgment module 540 sends the first identification information by adding the first identification information to the receiving acknowledgment.

In conclusion, the apparatus in this embodiment can help to improve transmission performance with reference to the apparatus shown in FIG. 4(a) to FIG. 4(d).

Figure 6A:
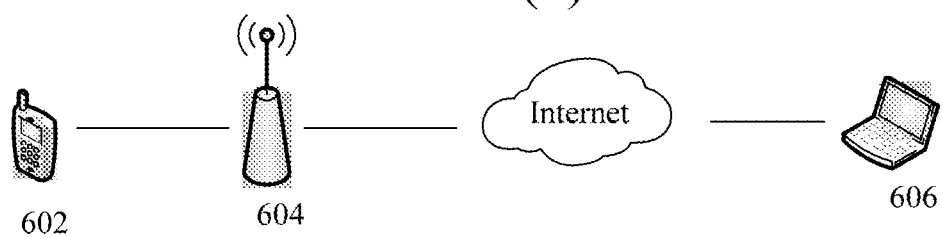
FIG. 6 (a) is a schematic diagram of a scenario of an example of data transmission performed according to a method and an apparatus in each embodiment of this application.
Figure 6B:
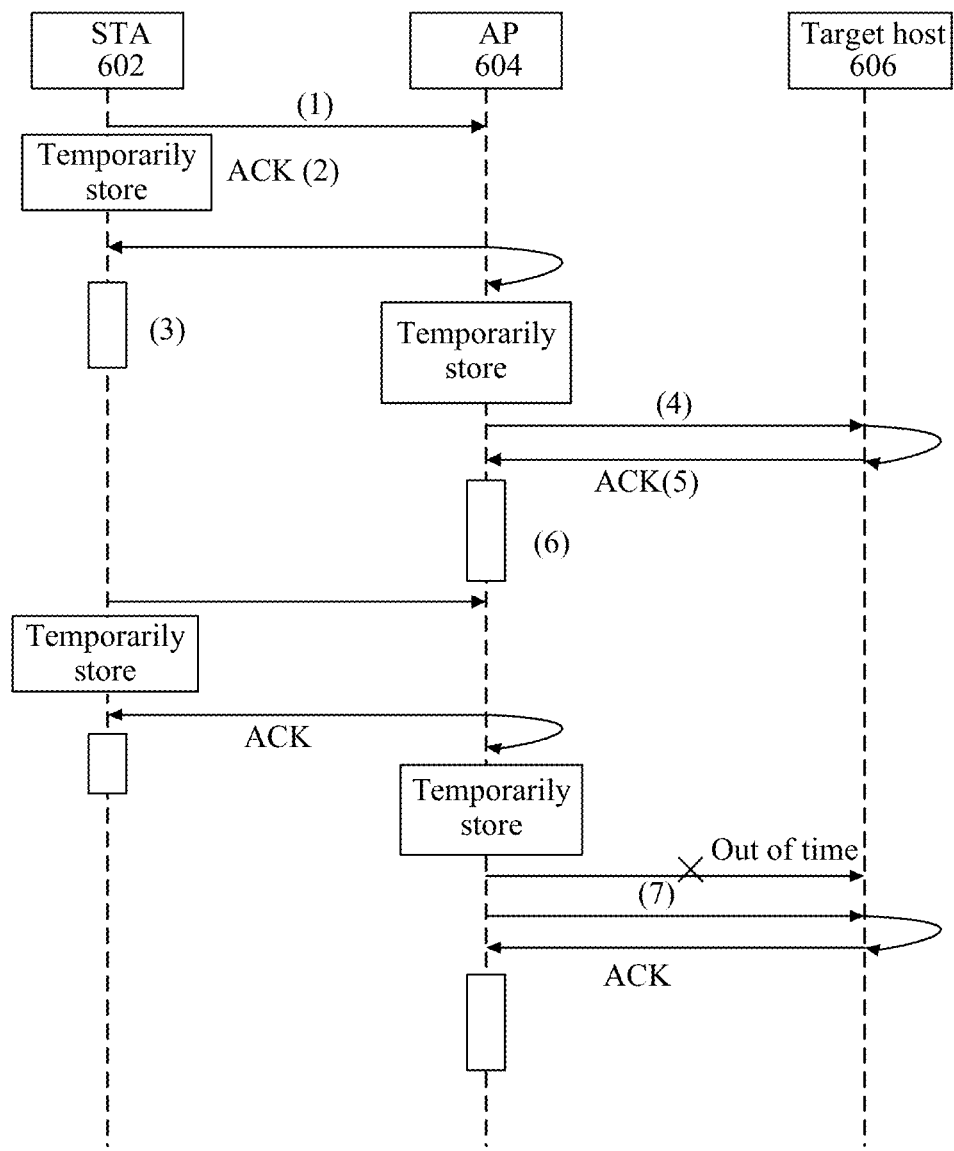

The following further describes the method and the apparatus in the embodiments of this application by using a scenario shown in FIG. 6 (a) as an example and by using a specific example.

In the scenario shown in FIG. 6 (a), a device of a sending end (first device) is a station (STA) 602, a device of a receiving end (second device) is a target host (target host) 606, and a middle device is an access point AP 604. The STA 602 is connected to a network by using the AP 604, and sends data to the target host 606 of the STA 602. A data transmission process is performed according to methods of the embodiments of this application, which is shown in FIG. 6 (b):

(1) The STA 602 sends, to the AP 604, a data packet whose destination is the target host 606, and temporarily stores the data packet.

(2) After receiving the data packet from the STA 602, the AP 604 feeds back an ACK to the STA 602.

(3) After receiving the ACK, the STA 602 considers that the target host 606 has already received the data packet, and therefore, can release a buffer for the data packet and send a next data packet.

(4) Use the Secure Hash Algorithm (Secure Hash Algorithm)-1, and generate a 160-byte message abstract (HASH value) by using a serial number (which is generated by the AP 604 and represents an ID of the data packet) of the data packet and a second type (SEND), and write the HASH value into an optional field of an IP data packet. As shown in FIG. 6(d), a maximum length of a header of an IP data packet is "1111", that is, 15*4=60 bytes. A minimum length of a header of an IP data packet is 20 bytes. For a standard IPv4data packet header, a value of a Header Length field is 1010. The buffer modifies a data packet of a header and sends the data packet to the target host 606.

(5) After receiving the data packet, the target host 606 parses a header of the data packet. If the value of the Header Length field is "1010", it indicates that the data packet comprises second identification information, which represents that the ACK should be sent to the AP 604, and the AP 604 does not need to forward the ACK to the STA 602; otherwise, it indicates that the data packet is not a data packet sent according to the method in this embodiment of this application, and the data packet should be processed in a conventional mechanism.

For a data packet sent according to the method in the embodiments of this application, the target host 606 generates first identification information according to the second identification information, and generates a HASH value by using a serial number (which is the same as the second identification information) of the data packet and a first type (ACK), and feeds back the HASH value to the AP 604 together with the ACK.

(6) After receiving the ACK fed back by the target host 606, the AP 604 releases, according to the first identification information, storage space for temporarily storing a corresponding data packet.

(7) If the data packet is lost or out of time in a transmission process, the AP 604 retransmits the data packet until an ACK for the data packet is received. The process is transparent to the STA 602.

Figure 7:
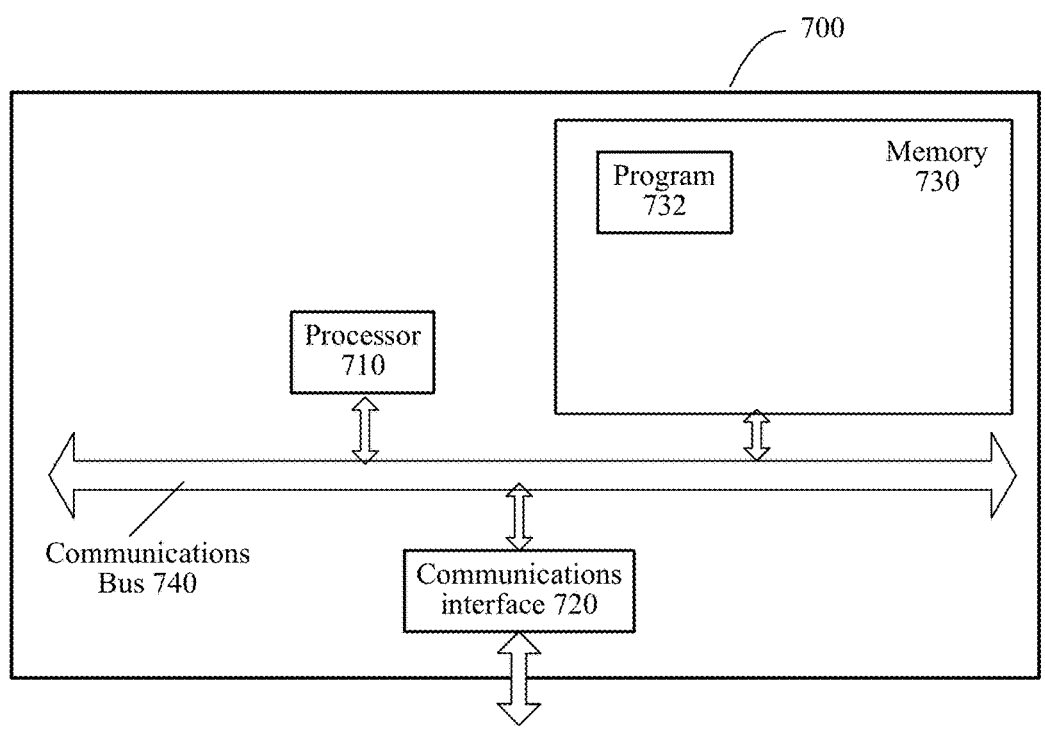
FIG. 7 is a structural block diagram of another example of a data transmission apparatus according to an embodiment of this application.

FIG. 7 is a schematic structural diagram of another example of a data transmission apparatus according to an embodiment of this application. Specific implementation of the data transmission apparatus is not limited in a specific embodiment of this application. As shown in FIG. 7, the data transmission apparatus 700 may comprise:

a processor (processor) 710, a communications interface (Communications Interface) 720, a memory (memory) 730, and a communications bus 740.

The processor 710, the communications interface 720, and the memory 730 communicate with each other through the communications bus 740.

The communications interface 720 is configured to communicate with a network element such as a client.

The processor 710 is configured to execute a program 732, and specifically, may execute a related step in the foregoing method embodiments.

Specifically, the program 732 may comprise program code. The program code comprises a computer operation instruction.

The processor 710 may be a central processing unit CPU or an application specific integrated circuit (Application Specific Integrated Circuit), or may be configured as one or more integrated circuits that implement the embodiments of this application.

The memory 730 is configured to store the program 732. The memory 730 may comprise a high-speed (RAM) memory, and may also comprise a non-volatile memory (non-volatile memory), for example, at least one magnetic disk storage. The program 732 may be specifically configured to enable the data transmission apparatus 700 to execute the following steps:

responding to a data packet received from a first device, and sending a receiving acknowledgment to the first device; and sending the data packet to a second device, wherein the second device is a target device of the data packet.

For specific implementation of the steps in the program 732, refer to corresponding description in the corresponding steps and units in the foregoing embodiments, and details are not described herein again. A person skilled in the art can clearly understand that, reference can be made to the corresponding process description in the method embodiments for the devices described above and the specific working procedures of the modules, and will not be repeated herein in order to make the description convenient and concise.

A person skilled in the art can clearly understand that, reference can be made to the corresponding process description in the apparatus embodiments for the devices described above and the specific working procedures of the modules, and will not be repeated herein in order to make the description convenient and concise.

Figure 8:
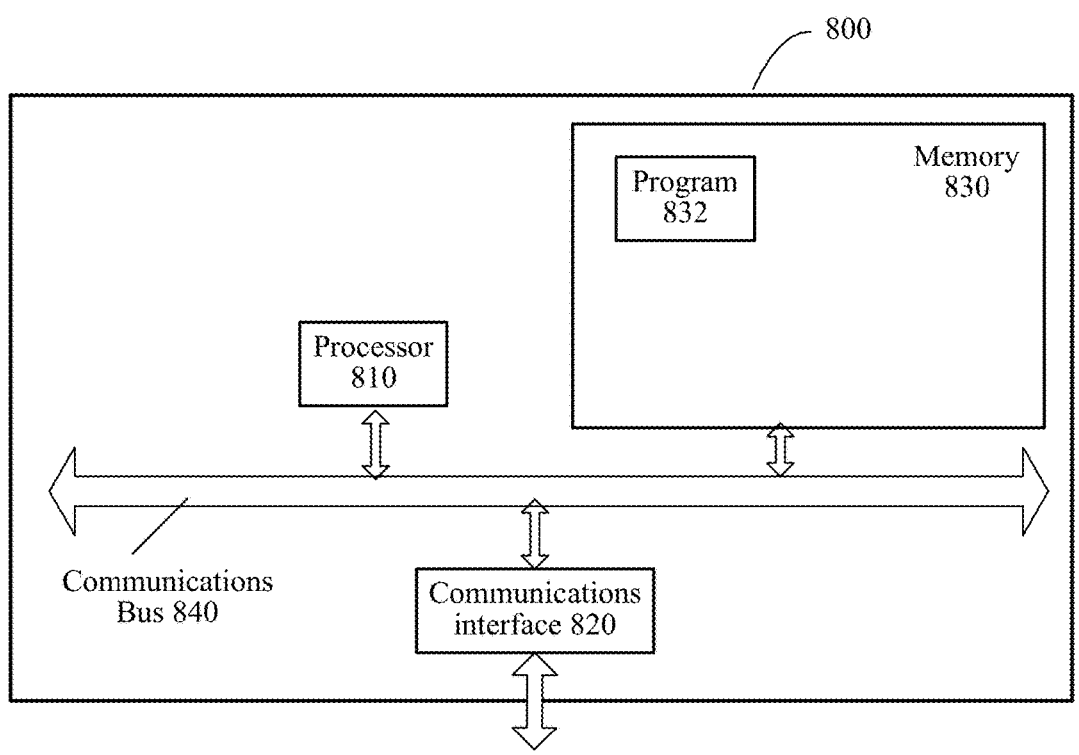
FIG. 8 is a structural block diagram of another example of a data receiving apparatus according to an embodiment of this application.

FIG. 8 is a schematic structural diagram of another example of a data receiving apparatus according to an embodiment of this application. Specific implementation of the data receiving apparatus is not limited in a specific embodiment of this application. As shown in FIG. 8, the data receiving apparatus 800 may comprise:

a processor (processor) 810, a communications interface (Communications Interface) 820, a memory (memory) 830, and a communications bus 840.

The processor 810, the communications interface 820, and the memory 830 communicate with each other through the communications bus 840.

The communications interface 820 is configured to communicate with a network element such as a client.

The processor 810 is configured to execute a program 832, and specifically, may execute a related step in the foregoing method embodiments.

Specifically, the program 832 may comprise program code. The program code comprises a computer operation instruction.

The processor 810 may be a central processing unit CPU or an application specific integrated circuit (Application Specific Integrated Circuit), or may be configured as one or more integrated circuits that implement the embodiments of this application.

The memory 830 is configured to store the program 832. The memory 830 may comprise a high-speed (RAM) memory, and may also comprise a non-volatile memory (non-volatile memory), for example, at least one magnetic disk storage. The program 832 may be specifically configured to enable the data receiving apparatus 800 to execute the following steps:

receiving a data packet; and sending a receiving acknowledgment associated with the data packet and first identification information associated with the data packet, wherein the first identification information is used to instruct not to forward the receiving acknowledgment.

For specific implementation of the steps in the program 832, refer to corresponding description in the corresponding steps and units in the foregoing embodiments, and details are not described herein again. A person skilled in the art can clearly understand that, reference can be made to the corresponding process description in the method embodiments for the devices described above and the specific working procedures of the modules, and will not be repeated herein in order to make the description convenient and concise.

Although a topic described herein is provided in common context executed with reference to executions of an operating system and an application program in a computer system, a person skilled in the art may know that another implementation may be executed with reference to a program module of another type. Generally, the program module comprises a routine, a program, a component, a data structure, and a structure of another type that execute a specific task or implement a specific abstract data type. A person skilled in the art may understand that, the topic described herein may be implemented by using configuration of another computer system, comprising a handheld device, a multi-processor system, a microprocessor-based or programmable consuming electronic product, a small-size computer, a mainframe or the like; or by using a distributed computer environment in which a task is executed by a remote processing device connected to a communications network. In the distributed computer environment, the program module may be located in local and remote storage devices.

A person of ordinary skill in the art may be aware that, in combination with the examples described in the embodiments disclosed in this specification, units and method steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

When the functions are implemented in the form of a software functional unit and sold or used as an independent product, the functions may be stored in a computer-readable storage medium. Based on such an understanding, the technical solutions of this application essentially, or the part contributing to the prior art, or a part of the technical solutions may be implemented in a form of a software product. The computer software product is stored in a storage medium, and comprises several instructions for instructing a computer device (which may be a personal computer, a server, a network device, or the like) to perform all or a part of the steps of the methods described in the embodiments of this application. The computer readable storage medium comprises a volatile and non-volatile, removable and non-removable medium that is implemented by using any method or technology used for storing information such as a computer readable instruction, a data structure, a program module, or other data. The computer readable storage medium specifically comprises, but not limited to, a USB disk, a removable hard disk, a read-only memory (ROM), a random access memory (RAM), an erasable programmable read-only memory (EPROM), an electrically erasable programmable read-only memory (EEPROM), a flash disk or another solid memory technology, a digital video disk (DVD), an HD-DVD, a blue-ray or another optical storage device, a tape, disk storage or another magnetic storage device, or any other medium that can be used for storing required information and can be accessed by the computer.

The foregoing implementing manners are only used to describe the present invention, but not to limit the present invention. Those of ordinary skill in the art can still make various alterations and modifications without departing from the spirit and scope of the present invention; therefore, all equivalent technical solutions also fall within the scope of the present invention, and the patent protection scope of the present invention should be subject to the claims.

What is claimed is:

1. A data transmission method implemented by a middle device, wherein the method comprises:
    responding to a data packet received from a first device, and sending a receiving acknowledgment to the first device, wherein the first device is a source device of the data packet;
    storing the data package in the middle device;
    generating second identification information associated with the data packet, wherein the second identification information comprises a HASH value that is associated with a serial number of the data packet and a second type, and the second type is sent by using the data packet;
    sending the data packet and the second identification information to a second device, wherein the second device is a target device of the data packet; and
    responding to a not-receiving acknowledgement that is received from the second device and that is associated with the data packet, and retransmitting the stored data packet to the second device.

2. The method of claim 1, wherein the sending the second identification information associated with the data packet to the second device comprises:
    sending the second identification information by adding the second identification information to a header of the data packet.

3. The method of claim 1, wherein the method further comprises:
    responding to a receiving acknowledgment that is received from the second device and that is associated with the data packet, and releasing storage space for storing the data packet.

4. The method of claim 1, wherein the method further comprises:
    responding to a receiving acknowledgment that is not received from the second device within a first preset time and that is associated with the data packet, and retransmitting the data packet to the second device.

5. The method of claim 1, wherein the method further comprises:
    responding to that the data packet from the first device is not correctly received, and sending a not-receiving acknowledgment to the first device.

6. The method of claim 1, wherein the receiving acknowledgment is a Media Access Control MAC layer message or a Transmission Control Protocol TCP layer message.

7. The method of claim 5, wherein the not-receiving acknowledgment is a Media Access Control MAC layer message or a Transmission Control Protocol TCP layer message.

8. A data receiving method, wherein the method comprises:
    receiving a data packet and second identification information associated with the data packet from a middle device wherein the data packet is transmitted from a source device to the middle device and stored in the middle device, wherein the second identification information comprises a HASH value that is associated with a serial number of the data packet and a second type, and the second type is sent by using the data packet; and
    responding to that the data packet is not correctly received, and sending a not-receiving acknowledgment associated with the data packet and first identification information associated with the data packet to the middle device, wherein the first identification information is generated based on the second identification information and comprises a HASH value that is associated with the serial number and a first type, and the first type is a receiving acknowledgment, wherein the first identification information is used to instruct the middle device not to forward the receiving acknowledgment, and the not-receiving acknowledgment is used to instruct the middle device to retransmit the data packet.

9. The method of claim 8, wherein the sending a receiving acknowledgment associated with the data packet and first identification information associated with the data packet further comprises:

sending the first identification information by adding the first identification information to the receiving acknowledgment.

10. The method of claim 8, wherein the receiving acknowledgment is a Transmission Control Protocol TCP layer message or a Media Access Control MAC layer message.

11. The method of claim 8, wherein the not-receiving acknowledgment is a Transmission Control Protocol TCP layer message or a Media Access Control MAC layer message.

12. A data transmission apparatus, wherein the apparatus comprises:

a first acknowledgment module, configured to respond to a data packet received from a first device, and send a receiving acknowledgment to the first device, wherein the first device is a source device of the data packet;

a first generation module, configured to generate second identification information associated with the data packet, wherein the second identification information comprises a HASH value that is associated with a serial number of the data packet and a second type, and the second type is sent by using the data packet;

a storage module, configured to store the data packet; and a first sending module, configured to send the data packet and the second identification information to a second device, and respond to a not-receiving acknowledgement that is received from the second device and that is associated with the data packet, and retransmit the stored data packet to the second device, wherein the second device is a target device of the data packet.

13. The apparatus of claim 12, wherein the first sending module is configured to send the second identification information by adding the second identification information to a header of the data packet.

14. The apparatus of claim 12, wherein the apparatus further comprises:

a storage control module, configured to respond to a receiving acknowledgment that is received from the second device and that is associated with the data packet, and release storage space for storing the data packet.

15. The apparatus of claim 12, wherein the first sending module is further configured to respond to a receiving acknowledgment that is not received from the second device within a first preset time and that is associated with the data packet, and retransmit the data packet to the second device.

16. The apparatus of claim 12, wherein the first acknowledgment module is further configured to respond to that the data packet from the first device is not correctly received, and send a not-receiving acknowledgment to the first device.

17. A data receiving apparatus, wherein the apparatus comprises:

a receiving module, configured to receive a data packet and second identification information associated with the data packet from a middle device, wherein the second identification information comprises a HASH value that is associated with a serial number of the data packet and a second type, and the second type is sent by using the data packet; and a second sending module, configured to respond to that the data packet is not correctly received, and send a not-receiving acknowledgment associated with the data packet and first identification information associated with the data packet, wherein the first identification information is used to instruct the middle device not to forward the receiving acknowledgment, and the not-receiving acknowledgment is used to instruct the middle device to retransmit the data packet stored on the middle device, wherein the first identification information is generated based on the second identification information and comprises a HASH value that is associated with the serial number and a first type, and the first type is a receiving acknowledgment.

18. The apparatus of claim 17, wherein the second sending module is configured to send the first identification information by adding the first identification information to the receiving acknowledgment.

19. A data transmission apparatus, wherein the apparatus comprises:

a transceiver, configured to receive a data packet and send a receiving acknowledgment;

a memory, configured to store an instruction; and a processor, configured to execute the instruction stored in the memory, wherein the instruction enables the processor to perform the following steps:

responding to a data packet received from a first device, and sending a receiving acknowledgment to the first device, wherein the first device is a source device of the data packet;

storing the data package in the data transmission apparatus;

generating second identification information associated with the data packet, wherein the second identification information comprises a HASH value that is associated with a serial number of the data packet and a second type, and the second type is sent by using the data packet;

sending the data packet and the second identification information to a second device, wherein the second device is a target device of the data packet; and responding to a not-receiving acknowledgement that is received from the second device and that is associated with the data packet, and retransmitting the stored data packet to the second device.

20. A data receiving apparatus, wherein the apparatus comprises:

a transceiver, configured to receive a data packet from a middle device and send, to the middle device, a receiving acknowledgment associated with the data packet and first identification information associated with the data packet, wherein the first identification information is used to instruct the middle device not to forward the receiving acknowledgment;

a memory, configured to store an instruction; and a processor, configured to execute the instruction stored in the memory, wherein the instruction enables the processor to perform the following step:

receiving a data packet and second identification information associated with the data packet from a middle device wherein the data packet is transmitted from a source device to the middle device and stored in the middle device, wherein the second identification information comprises a HASH value that is associated with a serial number of the data packet and a second type, and the second type is sent by using the data packet; and responding to that the data packet is not correctly received, and sending a not-receiving acknowledgment associated with the data packet and a first identification information associated with the data packet to the middle device, wherein the first identification information is used to instruct the middle device not to forward the receiving acknowledgment, and the not-receiving acknowledgment is used to instruct the middle device to retransmit the data packet stored on the middle device, wherein the first identification information is generated based on the second identification information and comprises a HASH value that is associated with the serial number and a first type, and the first type is a receiving acknowledgment.

* * * * *